United States Patent [19]

Wada et al.

[11] 4,282,348

[45] Aug. 4, 1981

[54] METHOD FOR REMOVING UNREACTED MONOMER FROM THE AQUEOUS DISPERSION OF POLYMERIZATE OF VINYL CHLORIDE AND APPARATUS THEREFOR

[75] Inventors: Norinobu Wada; Yoshitaka Okuno, both of Ibaragi, Japan

[73] Assignee: Shin-Etsu Chemical Co., Ltd., Japan

[21] Appl. No.: 782,732

[22] Filed: Mar. 30, 1977

[30] Foreign Application Priority Data

Apr. 3, 1976 [JP] Japan .................................. 51/37451

[51] Int. Cl.³ .......................... C08F 6/24; C08F 14/06
[52] U.S. Cl. ................................ 528/500; 159/4 CC;
159/16 S; 528/502
[58] Field of Search ................. 528/500; 526/344, 345

[56] References Cited

U.S. PATENT DOCUMENTS

| | | | |
|---|---|---|---|
| 3,622,553 | 11/1971 | Cines | 260/829 |
| 3,926,927 | 12/1975 | Stookey | 159/48 R |
| 3,954,910 | 5/1976 | Kropp | 260/879 |
| 3,956,249 | 5/1976 | Goodman | 528/500 |

FOREIGN PATENT DOCUMENTS

| | | | |
|---|---|---|---|
| 1248943 | 8/1967 | Fed. Rep. of Germany | 528/500 |
| 2331895 | 1/1974 | Fed. Rep. of Germany | 528/500 |

*Primary Examiner*—C. A. Henderson
*Attorney, Agent, or Firm*—McGlew and Tuttle

[57] ABSTRACT

Unreacted residual monomer is removed from an aqueous slurry of a vinyl chloride polymerizate by a method, according to which the monomer-containing aqueous slurry continuously fed to a plate column from its top runs down by way of a cyclone-type mist separator and through a plurality of perforated plates, coming into counter-current contact with steam which is blown into the column from its bottom and ascends through the same perforated plates, to dissipate the monomer in the form of vapors, and the steam carrying the dissipated monomer vapors having entered the mist separator is subjected to mist separation and heat exchange with the slurry fed, and the resulting steam is discharged out of the column, followed by condensation to recover the monomer. The slurry having reached the bottom of the column is transferred to a flush tank where it is quenched to generate steam which is then blown into the column for recycling.

10 Claims, 1 Drawing Figure

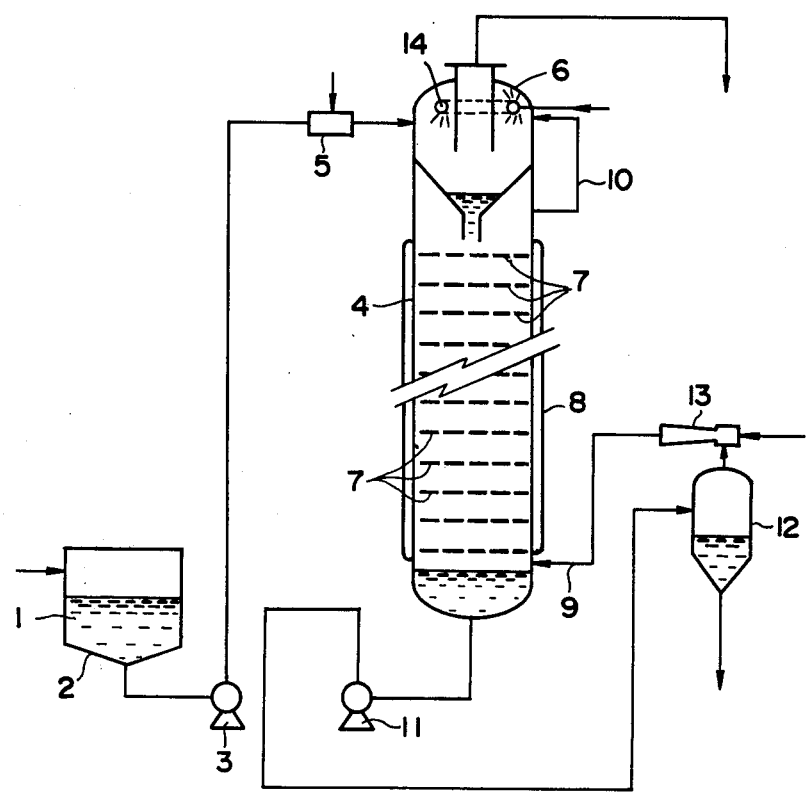

METHOD FOR REMOVING UNREACTED MONOMER FROM THE AQUEOUS DISPERSION OF POLYMERIZATE OF VINYL CHLORIDE AND APPARATUS THEREFOR

BACKGROUND OF THE INVENTION

1. Field of the Invention

The present invention relates to a method for efficiently and economically removing unreacted monomer from an aqueous dispersion of vinyl chloride polymerizate produced by the suspension or emulsion polymerization of vinyl chloride monomer or a mixture of monomers mainly composed of vinyl chloride in an aqueous medium and a system for the purpose.

2. Description of the Prior Art

Polyvinyl chloride (hereinafter referred to as PVC for brevity) is usually produced by the suspension or emulsion polymerization of vinyl chloride monomer in an aqueous medium, optionally with one or more comonomers. The aqueous dispersion of PVC, i.e. slurry or emulsion, formed following the completion of polymerization contains a considerable amount of residual vinyl chloride monomer remaining unreacted. Also in the finished PVC product obtained from the aqueous dispersion through separation and drying processes, a significant amount of unreacted residual monomer is contained. These facts tend to cause environmental pollution and adversely affect workers' health.

For the purpose of reducing residual monomer contents in the finished PVC product to a satisfactorily low level, it has been proposed to employ one or more means before or during the processing of the aqueous PVC dispersion, including the step of separating PVC from the aqueous dispersion and the step of drying the wet PVC cakes. The various methods practiced hitherto have failed to give satisfactory results. The complete removal of unreacted residual vinyl chloride monomer is an extremely difficult problem owing, on the one hand, to the porous structure of the particles of PVC produced especially by suspension polymerization, which is apt to absorb and retain more unreacted monomer; and, on the other hand, to the relatively low thermal stability of PVC, which makes it impossible to process the PVC with heat at a desirably high temperature.

The aqueous PVC dispersion, for example, is heated in a vessel under reduced pressure for a length of time, as disclosed in Japanese Public Disclosure No. 51-17288 of Japanese Patent Application based on U.S. Patent Applications Ser. Nos. 482,112, 482,113 and 482,115. In this method, however, it is not practical to conduct the heating at a sufficiently high temperature for a sufficiently long period of time for the complete removal of unreacted monomer, since discoloration tends to occur to the resulting PVC product at temperatures above a certain limiting point.

As a further example, the aqueous PVC dispersion is dehydrated by a dehydration apparatus, such as centrifugal separators, to form wet cake and the wet cake is brought into contact with steam, as disclosed in U.S. Pat. No. 3,956,249. This method is disadvantaged by a similar unsolved problem and also by difficulties encountered in the construction and operation of the apparatus to handle the wet cake.

SUMMARY OF THE INVENTION

It is an object of the present invention to provide a method, which is free of the above-described disadvantages which are encountered in the conventional methods, for the efficient removal of unreacted residual vinyl chloride monomer from an aqueous dispersion of PVC produced by the polymerization of vinyl chloride or a monomeric mixture of vinyl chloride and one or more comonomers in an aqueous medium. It is another object of the invention to provide a method with reduced possibilities of degrading the quality of the finished PVC product and also excellent productivity and low cost in the commercial production of PVC. It is a further object of the invention to provide an apparatus applicable for the practice of the method.

In accordance with the method of the present invention, an aqueous PVC dispersion, especially in the form of an aqueous slurry of PVC obtained by the suspension polymerization of vinyl chloride in an aqueous medium, is fed into the top of a plate column having a plurality of perforated plates inside and provided with an inlet for the slurry and an outlet for steam which are both located at the top of the column and an outlet for the slurry and an inlet for the steam which are both located at the bottom of the column. The aqueous slurry fed into the column through the inlet runs down through perforations or openings in the perforated plates, coming into counter-current contact with the steam which has been blown into the column through the inlet at the bottom and is ascending in the column through the same openings. The unreacted vinyl chloride monomer contained in the slurry is then dissipated in the column, and the steam carries the thus liberated vinyl chloride monomer to the top of the column thence to be discharged out of the column.

In one example of the invention, the monomer content in the PVC could be reduced from 2300 p.p.m. to less than 1 p.p.m. with a processing temperature of 102° C., thus causing no problems to the quality of the finished PVC product.

In order to obtain the highest efficiency in the process of the present invention, the optimum values in the dimensional parameters and the operational conditions of the plate column have been determined by experiments. According to the experiments, the "aperture ratio", i.e. the ratio of the total area of openings in one plate to the cross-sectional area of the column, is in the range from 3 to 20% or, preferably, from 5 to 15%; the diameter of each opening is in the range from 3 to 50 mm or, preferably, from 4 to 30 mm; the temperature maintained inside the column is in the range from 60° to 120° C. or, preferably, from 80° to 110° C.; and the pressure maintained inside the column is from about 1.0 to 1.5 times the saturated vapor pressure of water at that temperature.

BRIEF DESCRIPTION OF THE DRAWINGS

The only FIGURE in the case is a schematic diagram of an apparatus for practicing the invention.

DETAILED DESCRIPTION OF THE PREFERRED EMBODIMENTS

An aqueous slurry of PVC is obtained by the suspension polymerization of vinyl chloride in an aqueous medium, in which solid matter is usually contained in the range from 20 to 50% by weight, together with a considerable amount of unreacted vinyl chloride monomer. In most cases, the aqueous slurry of PVC after completion of polymerization is transferred from the polymerization reactor to a slurry tank and then from the slurry tank to a plate column. It is optional for the aqueous slurry to be sent from the polymerization reactor directly to the plate column, rather than by way of the slurry tank. The suspension polymerization of vinyl chloride is generally carried out at a temperature ranging from 50° to 65° C., and the resulting aqueous slurry naturally remains at the same temperature before it is sent to the plate column. When the slurry reaches the plate column, however, it will have become cooled to a temperature somewhat lower than the polymerization temperature due to heat loss during transportation by way of piping. It is, therefore, advisable that the slurry be heated before it reaches the plate column by some heating means to a temperature above 70° C. or, preferably, in the range from 70° to 100° C. Such pre-heating means is not specifically limited; it may be, for example, that the slurry is heated by means of the so-called in-line heater installed in the piping using blown in steam, or the slurry may be heated by some other means of heating carried out from outside the piping. The most preferred method, however, is that the slurry be heated before being fed into the plate column in a mist separator by direct contact with the steam which has been taken into the mist separator from the top of the plate column. This heating method using the mist separator is advantageous not only from the standpoint of economy in heat energy but also from the additional facts that entrained particles in the gas stream are eliminated by being caught by the slurry and that splashing or foaming in the column is greatly reduced.

In accordance with one embodiment of the invention, the aqueous PVC slurry at a temperature somewhat lower than the polymerization temperature or heated to a temperature between 70° and 100° C. is fed to the plate column from its top, either by pouring the slurry from the end of the piping into the mist separator positioned to occupy the upper portion of the plate column or by ejecting the slurry by pressure from spray nozzles connected to the end of the piping into the mist separator. By the spraying method, an additional advantage can be obtained in the efficiency of the monomer removal, since the sprayed slurry falls down evenly all over the surface of the uppermost perforated plate and also a considerable portion of unreacted vinyl chloride monomer can be dissipated before the falling slurry reaches the uppermost perforated plate.

The rate of feeding of the aqueous PVC slurry to the plate column should, of course, be determined in consideration of various parameters, including the composition of the slurry, the diameter and the height of the plate column employed, the method of introduction the slurry into the plate column, the aperture ratio of the perforated plates, operational conditions, e.g. temperature and pressure, inside the plate column, the intended extent of the monomer removal, and the like. In one example, the rate of feeding is more than 25 tons per hour of aqueous PVC slurry when the plate column is 1.15 meter in diameter and 15 meter in height.

The aperture ratio of each perforated plate in the plate column is limited to 3 to 20% of the cross-sectional area of the column. This is because a smaller ratio than 3% tends to increase the resistance exerted on the aqueous slurry running down and the steam ascending within the column, resulting in decrease of the working capacity of the plate column as a natural consequence, as well as in certain difficulties in the operation of the plate column due to the narrow range of the conditions for smooth movement of the slurry within the plate column. On the other hand, an aperture ratio larger than 20% leads to an economical disadvantage of excessive steam consumption over the amount necessary for the removal of the vinyl chloride monomer, though some advantages may be witnessed in the increased working capacity of the plate column and the widened range of conditions for the smooth movement of the slurry.

The diameter of openings in the perforated plates is limited to 3 to 50 mm, because those smaller than 3 mm in diameter are readily clogged with solid matter, resulting in no smooth working of the plate column while, on the other hand, those larger than 50 mm in diameter bring about a less intimate counter-current contact between the falling slurry and the ascending steam, resulting in an insufficient monomer removal.

The plate column employed in the present invention may be similar to those widely employed as distillation columns, but the characteristic difference is in the design of the perforated plate. The perforated plate in a conventional plate column is, in most cases, provided with a weir along the circumference of the plate or around each opening in order to retain certain volumes of the liquid under distillation on the plate. On the contrary, the perforated plate installed in the plate column according to the method of the present invention has been found preferably not to have a weir or weirs. One reason for this may be that the existence of weirs brings about difficulties in controlling the time for the slurry, which is not a freely flowing liquid, to be retained on the plate in accordance with the fluctuating rates of feeding of the slurry to the plate column. Another reason may be that the existence of weirs brings about the socalled phenomenon of channeling, i.e. uneven distribution of the falling slurry within the plate column, resulting in the segregation of solid matter from the aqueous medium in the slurry. Moreover, other disadvantages are also caused, for example, in increased tendency toward the deposition of solid matter on the complex surfaces of the column and increased costs for the manufacture of the perforated plates with weirs.

The retention time of the slurry in the plate column should be controlled in order to avoid the discoloration of the PVC due to excessive heating. For example, about 5 minutes or less on an average is permissible when the processing temperature is 120° C. though a longer time is tolerable at a lower temperature.

It is recommended that each of the perforated plates is arranged so as to provide a small clearance between the periphery of each plate and the surface of the inner wall of the column. Through such clearance the slurry flows down continuously to effectively wash down any solid matter which has deposited on the column wall. The width of the clearance way be as small as 10 mm or less or, preferably from 1 to 5 mm.

The number of perforated plates in one plate column used in the method of the invention should, of course, be as many as possible to achieve the highest efficiency of monomer removal. However, the plate column having at least three or, preferably from 5 to 50 plates, is practically satisfactory. A larger number of the perforated plates can not afford as much substantial benefit in view of increasing costs in the construction and operation of the column. The optimum number of the plates should be determined in consideration of various factors, such as the kinds of the PVC product to be treated and the processing temperature.

Further, the distance between two adjacent plates in the column is determined in the range from 30 to 80 cm in consideration of the problems of increasing construction cost for larger columns and the difficulty of operating the column with the perforated plates arranged in smaller distances due to an increased flooding tendency.

The temperature inside the plate column during operation is, as mentioned before, kept desirably in the range from 60° to 120° C., more preferably, from 80° to 110° C. This requirement does not mean to have a uniform temperature distribution throughout the column. For example, a temperature difference of 20° C. or so is permissible between the top and the bottom of the column.

The pressure inside the plate column is, as mentioned before, kept in the range from 1.0 to 1.5 times the saturated vapor pressure of water at the temperature with, of course, a certain pressure drop from the column bottom to the column top. When it is necessary to have the pressure inside the column at a reduced pressure lower than atmospheric, the steam in the column is drawn by a suitable means, such as a blower, to be discharged from the column.

The steam blown into the plate column at the bottom functions in three ways. Firstly, the heat of the steam maintains the temperature inside the plate column in the above specified range. Secondly, the dissipation of the unreacted monomer vapor from the aqueous slurry is promoted by intimate counter-current contact between the aqueous slurry running down and the steam ascending within the column through the openings in the perforated plates. Thirdly, the ascending steam as a carrier gas carries the dissipated monomer vapor for disposal out of the plate column. As a matter of course, the temperature and amount of the steam blown into the column should be determined so that the above described functions of the steam can be sufficiently exhibited. It is optional that, if necessary, the column is so designed to have an auxiliary outer heating means, such as a jacket in which steam or hot water is passed to more easily control the temperature inside the plate column to the desired degree.

In a preferred design of the plate column, a mist separator of the cyclone type is installed on the top outside of or inside the column in its upper part. The steam, which has been blown into the column from its bottom, and ascends up to the column top through openings in the perforated plates coming in counter-current contact with the descending aqueous slurry to effect heat exchange and in company with the dissipated monomer, is introduced into the mist separator. The steam is brought into contact in co-current vortex in the mist separator with the fresh supply of an aqueous slurry from the slurry tank, to effect the removal of entrained particles and the suppression of the occurrence of splashes and foams, as well as the heating of the slurry. Along with the economical advantage achieved by heat exchange between the steam and the slurry in the mist separator, there is an additional advantage that the equipment outside the plate column for the monomer separation from the steam coming out of the column can be made smaller than otherwise. In a preferred design of the mist separator, a plurality of spray nozzles are provided within the mist separator, from which washing water is continuously or intermittently sprayed over the inner walls of the mist separator to wash away any solid matter deposited thereon.

The steam discharged from the top of the plate column carrying the monomer vapor is then condensed by any known method, such as cooling in a condenser, and the monomer vapor, freed of water, is subsequently recovered. On the other hand, the slurry, having descended to the bottom of the column and having a much reduced monomer content, is transported to a flush tank. The slurry is cooled rapidly in the flush tank to about 70° C. or below, under reduced pressure. The steam generated in the flush tank from the aqueous slurry is suctioned by a steam ejector and blown back into the bottom of the column together with the steam used for driving the steam ejector. The use of the flush tank is advantageous in that the residual amount of unreacted vinyl chloride monomer contained in the slurry is further decreased by dissipation in the flush tank and also in that the steam is economically recovered for re-use.

The aqueous slurry cooled and drawn out of the flush tank is then sent to an apparatus for solid-liquid separation, such as a centrifugal separator, for the purpose of dehydration to convert it to the form of wet cake, followed by drying to produce dried PVC.

The method of the present invention is now further illustrated with reference to the accompanying drawing.

The FIGURE is a schematic diagram of an exemplary apparatus for the embodiment of the method of the present invention with a plate column having a plurality of perforated plates, a mist separator of the cyclone type installed in the upper part of the plate column and a flush tank which is connected to the outlet for the slurry at the bottom of the plate column. In the facility shown in the drawing, the aqueous PVC slurry 1 contained in slurry tank 2, having been introduced there from a polymerization reactor (not shown), is sent by slurry pump 3 to plate column 4 within which weirless perforated plates 7 are provided. On the way from slurry tank 2 to the top of plate column 4, slurry 1 is heated to a predetermined temperature by steam blown directly into the slurry at in-line heater 5 connected to the piping in series. The slurry, having reached the top of plate column 4, is ejected into mist separator 6 in a tangential direction, where the slurry is subjected to heat exchange with steam which, having ascended through plate column 4, has been blown into mist separator 6. The aqueous slurry then moves down over the uppermost one of perforated plates 7 in plate column 4 and further downwards through numerous openings in the same and other perforated plates 7. The slurry, having reached the column bottom, is taken out of column 4 and sent to flush tank 12 by means of pump 11, where the slurry is cooled. The cooled slurry is drawn to and stored in another slurry tank (not shown).

The steam to be principally used for the purpose of the present invention is blown into plate column 4 at the bottom from steam ejector 13 through piping 9, together with the other steam which has been evaporated from the aqueous slurry in flush tank 12 and joined with the principal steam at steam ejector 13. The steam all together in plate column 4 ascends through the openings in each perforated plate 7 in counter-current contact with the slurry falling downwardly in plate column 4. The temperature inside plate column 4 is maintained in the desired range by means of the steam with a gradient of higher temperatures at the bottom and lower temperatures at the top. The control of the temperatures is facilitated by a heat insulating layer surrounding column 4 or, if necessary, by passing steam or hot water through jacket 8 enveloping plate column 4. The pressure inside the column 4 is regulated in the desired range, if necessary, by means of a blower (not shown) connected to a condenser (not shown). The pressure, being closely interrelated with the temperature in plate column 4, is about the same as the saturated vapor pressure of water at the temperature at the bottom, or 1.0 to 1.5 times the saturated vapor pressure of water at the temperature at the top.

The steam carrying the monomer vapor dissipated from the aqueous slurry in column 4 is blown into mist separator 6 through by-pass 10 leading from a point on the wall of column 4 above the uppermost perforated plate to mist separator 6 in a tangential direction, to produce a co-current vortex with the aqueous slurry which is newly fed from slurry tank 2 into and staying in mist separator 6. The steam in mist separator 6, is freed of any entrained particles while being subjected to heat exchange with the slurry, and then discharged out, followed by condensation in a condenser (not shown) to leave the monomer vapor uncondensed to be subsequently recovered.

In mist separator 6, a plurality of spray nozzles are provided for purposes of spraying water over the surfaces in contact with the moving slurry to wash away any solid matter depositing thereon.

The method of the present invention is applicable not only to the aqueous slurry obtained by the homopolymerization of vinyl chloride in an aqueous suspension but, naturally, also to the aqueous slurry obtained by the copolymerization of vinyl chloride with one or more copolymerizable monomers, such as vinylidene chloride and vinyl acetate. The advantageous features of the method of the present invention over the conventional methods are summarized as follows.

(1) Low costs for the construction, operation and maintenance of the apparatus. The plate column which is the main equipment has a very simple structure with weirless perforated plates and without any moving or rotating parts.

(2) Uniform downward flow of the aqueous slurry in the plate column without the occurrence of channeling. No prolonged and localized stay of the slurry on each perforated plate leads to the reduced possibility of thermally degradating the resulting PVC product. The uniform flow of the slurry is promoted by the clearance provided between the periphery of each perforated plate and the inner wall of the plate column.

(3) Low consumption of steam. The steam ascending in the plate column can, even if condensed at a lower part of the plate column, be utilized again by being evaporated in the upper part of the column where a lower pressure is prevailing, since the working pressure in the plate column has a gradient declining lower and lower toward the top from the bottom of the plate column.

(4) Saving of heat energy, which is achieved by heat exchange between the steam and the aqueous slurry taking place in the mist separator.

(5) No danger of blockage in the processing steps subsequent to the operation of the plate column, since the entrained particles included in the steam are almost completely removed and foams are destroyed in the mist separator.

(6) The use of a flush tank for receiving the high temperature slurry from the plate column for quenching treatment. In the flush tank, steam is recovered from the slurry for recycling through the plate column, while the slurry become to have less monomer content.

The following examples will further illustrate the method of the present invention. In each experiment given in the examples, no carrying-over of the slurry per se or in the form of foams by the steam discharged from the plate column took place. Also in the experiments which were carried out for 24 or 168 hours of continuous operation, no blockage in the perforated plates or in the mist separator was witnessed, if not otherwise mentioned.

Further in the table accompanying the examples, the initial coloring and heat stability of the PVC product obtained in each experiment were evaluated in the following manner.

Initial coloring: 100 parts by weight of the PVC resin to be tested, 1 part by weight of dibutyl tin dilaurate, 0.5 part by weight of cadmium stearate, 50 parts by weight of dioctyl phthalate were mixed uniformly. The resulting mixture was milled on a hot roller mill at 170° C. to obtain a sheet of 160 mm wide and 1 mm thick. The sheet was placed in a metal mold with the dimensions of 40 by 40 by 15 mm and pressed at 170° C. for 3 minutes under a pressure of 250 kg/cm$^2$ after preheating at 170° C. for 7 minutes. The color of the thus prepared test piece was compared to the color of a control test piece prepared from a commercial-grade PVC resin (TK 1000, product of Shin-Etsu Chemical Co., Ltd., Japan) by a similar procedure. The degree of coloring was expressed by the notation "good" which is for the same level as, or less than that of the commercial-grade goods and the notation "poor" which is for apparently deeper coloring than the commercial-grade goods.

Heat stability: 100 parts by weight of the PVC resin to be tested, 3 parts by weight of tin maleate and 0.5 part by weight of stearic acid was blended uniformly on a roller mill at 170° C. to obtain a sheet 160 mm wide and 0.7 mm thick. The sheet was cut into pieces of 30 mm$\times$60 mm each, and the thus prepared test pieces were heated in Geer's oven at 190° C. Simultaneously, six control test pieces prepared from a PVC resin of the commercial grade (TK 1000, product of Shin-Etsu Chemical Co., Ltd., Japan) in similar manner were placed in the same oven. The test pieces of this Example were taken out of the oven one by one each at an interval of 20 minutes together with one of the control test pieces, and the two comparable test pieces were visually observed with respect to coloring or charring due to thermal decomposition. The results were shown by the notation "good" which is for an equal or better heat stability than the commercial grade goods and the notation "poor" which is for an inferior heat stability to the commercial grade goods.

EXAMPLE 1 (Experiments No. 1 to No. 4)

A plate column of 310 mm in inner diameter with a mist separator of the cyclone type included in the upper part and five perforated plates positioned at a distance of 800 mm apart from each other in the column. The perforated plates had no weirs and the aperture ratio and the diameter of the openings were varied as indicated in the table given at the end of Example 6. The clearance between the periphery of each plate and the surface of the inner wall of the column was set at 1.5 mm. An aqueous slurry with 40% by weight of solid content of PVC and with the degree of polymerization of about 1,000 was fed continuously to the column at the top at a rate of 1,650 kg per hour, while the thus introduced slurry was discharged from the bottom of the column and sent to the flush tank there to be quenched to 70° C. The steam generated from the aqueous slurry in the flush tank was suctioned by the ejector, driven with steam from another source under a pressure of 7 kg/cm$^2$G at 163° C. The steam from the two sources together was blown into the column at the bottom, allowed to ascend through the column and finally discharged out of the column at the top via the mist separator. In the mist separator, a spray ring with several nozzles was provided for washing any solid matter depositing on the wall.

Other details of each experiment and the results are shown in the table. After a 24 hour continuous operation, the plate column was disassembled and it was found that no solid matter remained depositing inside the mist separator. On the contrary, when no water was supplied to the spray ring in the mist separator, a considerable amount of discolored, brownish polymer deposition was found.

EXAMPLE 2 (Experiments No. 5 and No. 6, comparative)

The same procedure as in Example 1 was repeated except that some experimental conditions were changed as indicated in the table, in order to demonstrate how the varying diameters of openings in the perforated plates would be effective. When the diameter was 2 mm, a long-run operation was unavailable due to the blockage of the openings with solid matter. When the diameter was 60 mm, monomer removal from the aqueous slurry was unsatisfactory because of insufficient contact between the aqueous slurry and the steam. The results are shown in the table.

EXAMPLE 3 (Experiments No. 7 and No. 8, comparative)

The same procedure as in Example 1 was repeated except that some experimental conditions were changed as indicated in the table, in order to demonstrate the effect of the aperture ratio of the perforated plates. With the aperture ratio of 2%, the flow rate of the steam could not be so high that some difficulties were encountered in the operation of the plate column while, with the aperture ratio of 25%, the steam consumption was excessively high over that in Example 1. The results are shown in the table.

EXAMPLE 4 (Experiment No. 9)

The same procedure as in Example 1 was repeated except that the aqueous slurry fed to the plate column contained 34% by weight of a co-polymerizate produced from a monomer mixture of 15% by weight of vinyl acetate and 85% by weight of vinyl chloride by suspension polymerization. The details of the experimental conditions and the results are shown in the table.

The initial coloring and heat stability of the finished product in this particular example were compared to those of the corresponding commercial grade copolymeric resin (SC 500, product by Shin-Etsu Chemical Co., Japan) and no differences were found.

EXAMPLE 5 (Experiments No. 10 and No. 11)

The plate column employed in this example had a inner diameter of 1,150 mm and 24 perforated plates without weirs, the plates each being positioned at a distance of 550 mm apart from the adjacent ones. The diameter of openings in each perforated plate was 18 mm and the aperture ratio was 9%. The width of the clearance between the periphery of the plate and the inner wall of the column was 3 mm. A mist separator of the cyclone type with 3 spray rings for washing water was installed in the upper part of the plate column. The same aqueous PVC slurry as employed in Example 1 was fed at a rate of 16,500 kg per hour to the plate column at the top, while the slurry was discharged out of the plate column at the bottom. The difference in temperatures at the column bottom and the column top was about 10° C. in Experiment No. 10 or 4° C. in Experiment No. 11 and the pressure drop from the bottom to the top of the column was about 140 mmHg in each experiment. The discharged slurry was immediately sent to the flush tank continuously, where the slurry was quenched to 70° C. by being deprived of the latent heat of evaporation of part of the water. The steam generated in the flush tank was suctioned by the steam ejector under a pressure of 6 kg/cm$^2$G at 159° C., and the exhaust steam was blown into the plate column at the bottom in combination with the steam recovered in the flush tank from the aqueous slurry. The thus introduced steam ascended through the column making counter-current contact with the slurry running down, followed by discharge which was by way of the mist separator. The details and results of the experiments are shown in the table.

EXAMPLE 6 (Experiment No. 12, comparative)

The same experimental procedure as in Experiment No. 1 was repeated with some of the parameters changed as indicated in the table. The conditions and the results are shown in the table. It is clear from the data that temperatures higher than 120° C. result in inferior qualities of the PVC products, despite good results obtained for monomer removal.

TABLE

| Experiment No. | 1 | 2 | 3 | 4 | 5 | 6 | 7 | 8 | 9 | 10 | 11 | 12 |
|---|---|---|---|---|---|---|---|---|---|---|---|---|
| Diameter of column, mm | 310 | 310 | 310 | 310 | 310 | 310 | 310 | 310 | 310 | 1150 | 1150 | 310 |
| Number of plates | 5 | 5 | 5 | 5 | 5 | 5 | 5 | 5 | 5 | 24 | 24 | 5 |
| Diameter of opening, mm | 6 | 6 | 9 | 18 | 2 | 60 | 6 | 6 | 18 | 18 | 18 | 6 |
| Aperture ratio, % | 10 | 10 | 12.2 | 9 | 5 | 18.7 | 2 | 25 | 9 | 9 | 9 | 10 |
| Feeding rate of slurry, kg/hr. | 1650 | 1650 | 1650 | 1650 | 800 | 1650 | 800 | 1650 | 1650 | 16500 | 16500 | 400 |
| Temperature of slurry fed, °C. | 60 | 81 | 59 | 85 | 60 | 85 | 85 | 85 | 98 | 55 | 55 | 110 |
| Temperature inside column, average, °C. | 85 | 100 | 90 | 85 | 85 | 85 | 85 | 85 | 100 | 85 | 102 | 125 |
| Pressure at column bottom, mmHgG | −320 | 0 | −230 | −320 | −320 | −320 | −320 | −320 | 0 | −320 | +115 | +980 |

TABLE-continued

| Experiment No. | 1 | 2 | 3 | 4 | 5 | 6 | 7 | 8 | 9 | 10 | 11 | 12 |
|---|---|---|---|---|---|---|---|---|---|---|---|---|
| Retention of slurry in column, min. | 0.96 | 0.49 | 0.85 | 0.82 | * | 1.20 | 0.75 | 0.72 | 0.8 | 6.5 | 6.9 | 2.5 |
| Flow rate of steam in column, kg/hr. | 85 | 92 | 190 | 36 | 60 | 380 | 9.5 | 475 | 130 | 1220 | 1250 | 98 |
| Steam recovery in mist separator, kg/kg PVC | 0.080 | 0.060 | 0.082 | 0 | * | 0 | 0 | 0 | little | 0.08 | 0.144 | little |
| Steam recovery in flush tank, kg/kg PVC | ** | ** | 0.049 | 0.048 | * | ** | ** | ** | ** | 0.048 | 0.082 | ** |
| Monomer content in slurry before processing, p.p.m. | 1734 | 6017 | 2500 | 1960 | * | 2500 | 1850 | 3300 | 2100 | 7500 | 2300 | 920 |
| Monomer content in slurry after processing, p.p.m. | 717 | 732 | 914 | 950 | * | 1600 | 1200 | 830 | 470 | 140 | <0.4 | <0.4 |
| Initial coloring | good | good | good | good | — | good | good | good | — | good | good | poor |
| Meat stability | good | good | good | good | — | good | good | good | — | good | good | poor |

Notes:
*Unavailable.
**Flush tank, unused.

EXAMPLE 7 (Experiments No. 13 and No. 14)

The arrangement of the equipment and the experimental conditions were the same as in Experiment No. 1 except that the clearance between the periphery of each perforated plate and the inner wall of the column was 10 mm in Experiment No. 13 or no clearance was provided in Experiment No. 14.

In Experiment No. 13, the monomer removal was somewhat unsatisfactory compared to Experiment No. 1, while the steam consumption was excessively high so that the flow rate of steam in the column was about 400 kg/hour.

In Experiment No. 14, the experimental results were almost identical with those in Experiment No. 1, but, after 24 hours of continuous operation, it was found that solid matter had deposited at just below the corners where the periphery of each plate and the column wall were in contact with each other.

What is claimed is:

1. A method for removing unreacted residual vinyl chloride monomer from an aqueous slurry of a vinyl chloride polymerizate containing unreacted vinyl chloride monomer which slurry is of the usual range of 20 to 50% solid by weight and is produced by the polymerization of vinyl chloride or a monomer mixture mainly composed of vinyl chloride in an aqueous medium comprising:

(a) feeding the aqueous slurry to a cyclone type mist separator positioned at the top of a column having a sequence of perforated plates with openings of from about 3 to 50 mm in diameter, the total area of the openings in one perforated plate being in the range from about 3 to 20% of the cross-sectional area of the plate, (b) feeding the aqueous slurry coming from the cyclone-type mist separator to the top of the column whereby the aqueous slurry flows downwardly through the perforations in the perforated plates, (c) blowing steam into the bottom of the column, to cause it to ascend in the column through the perforations of the perforated plates to bring the steam into counter-current contact with the descending aqueous slurry, and (d) maintaining a temperature of between about 60° to 120° C. and a pressure of about the saturated vapor pressure of water at that temperature inside the column.

2. The method as claimed in claim 1, wherein the perpendicular distance between two adjacent perforated plates is in the range from 30 to 80 cm.

3. The method as claimed in claim 1, wherein the aqueous slurry in the mist separator is heated to a temperature in the range from 70° to 100° C. by heat exchange with the steam.

4. The method as claimed in claim 1, wherein the aqueous slurry, having reached the bottom of the column, is discharged out of the column and transferred to a flush tank where the aqueous slurry is subjected to quenching and evaporation of water under reduced pressure to generate steam.

5. The method as claimed in claim 4, wherein the steam generated by the evaporation of water from the aqueous slurry in the flush tank is suctioned by a steam ejector and tnerefrom blown into the column for recycling.

6. The method as claimed in claim 1, wherein each perforated plate is positioned so as to provide a clearance between its periphery and a inner wall of the column.

7. The method as claimed in claim 1, wherein the pressure inside the plate column is in the range from 1.0 to 1.5 times the saturated vapor pressure of water at the temperature taken at the position where the pressure is measured.

8. The method as claimed in claim 1, wherein the aqueous slurry to be fed to the column is subjected to pre-heating to a temperature in the range from 70° to 100° C.

9. The method as claimed in claim 1, wherein the perforated plate has no weirs.

10. The method as claimed in claim 6, wherein the width of the clearance does not exceed 10 mm.

* * * * *